US009734840B2

(12) United States Patent
Yoshizuka et al.

(10) Patent No.: US 9,734,840 B2
(45) Date of Patent: Aug. 15, 2017

(54) SIGNAL PROCESSING DEVICE, IMAGING APPARATUS, AND SIGNAL-PROCESSING PROGRAM

(75) Inventors: Yoko Yoshizuka, Tokyo (JP); Mitsuhiro Okazaki, Saitama (JP); Kosuke Okano, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 910 days.

(21) Appl. No.: 13/435,774

(22) Filed: Mar. 30, 2012

(65) Prior Publication Data

US 2012/0250885 A1 Oct. 4, 2012

(30) Foreign Application Priority Data

Mar. 30, 2011 (JP) ................................ 2011-075457

(51) Int. Cl.
*H04B 15/00* (2006.01)
*G10L 21/0232* (2013.01)

(52) U.S. Cl.
CPC ................................ *G10L 21/0232* (2013.01)

(58) Field of Classification Search
CPC ..... G06F 17/3074; G06F 3/16; H04R 1/1083; H04R 2499/11; H04R 2499/13; H04R 3/04; H04R 3/00; H03G 5/165; H03G 3/00; H03G 3/32; H03G 5/005; H03G 5/16; H03G 9/025; G10K 15/02; G10K 15/04; G10K 2210/108; G10K 2210/128; G10K 2210/12821; G10K 2210/3014; G10K 11/16; G10L 21/0208; G10L 15/20; G10L 19/0204; G10L 21/0232; G10L 21/057; G10L 25/27; G10L 21/02; H04B 15/00; H04B 1/109; H04B 3/21; H04N 5/772; H04N 5/225; A63B 2071/0625; A63B 71/0622
USPC .......... 381/306, 23.1, 302, 61, 66, 316, 320, 381/71.3–71.7, 71.11–71.14, 73.1, 74, 79, 381/86, 94.2, 94.3, 94.7, 97, 98, 100, 381/101, 102, 103, 110, 119, 94.1;
(Continued)

(56) References Cited

U.S. PATENT DOCUMENTS

| | | | |
|---|---|---|---|
| 6,339,758 B1 | 1/2002 | Kanazawa et al. | |
| 7,698,133 B2 | 4/2010 | Ichikawa | |

(Continued)

FOREIGN PATENT DOCUMENTS

| | | | |
|---|---|---|---|
| JP | A-2000-047699 | 2/2000 | |
| JP | 2004-341339 A * | 12/2004 | ............. G10L 21/02 |

(Continued)

OTHER PUBLICATIONS

Japanese Office Action issued in Application No. 2011-075457; Dated Jan. 29, 2013 (With Translation).

*Primary Examiner* — Leshui Zhang
(74) *Attorney, Agent, or Firm* — Oliff PLC

(57) ABSTRACT

A signal-processing device includes a determination section that compares a frequency spectrum and a floor spectrum of an input audio signal to each other for each frequency bin and determines whether the input audio signal should be subjected to noise reduction processing or not for each of the frequency bins; and a noise reduction-processing section that subtracts a noise frequency spectrum from the frequency spectrum of the input audio signal for each of the frequency bins on the basis of the result determined by the determination section for each of the frequency bins.

22 Claims, 5 Drawing Sheets

(58) Field of Classification Search
USPC .. 704/E19.013, E19.014, E19.015, E21.011; 455/63.1, 67.13, 569.2, 570, 114.2, 135, 455/222, 223, 278.1, 283, 296; 700/94; 348/207.99, E05.024, 222.1, 241, 231.3, 348/231.4, 94.1, 94.2
See application file for complete search history.

(56) References Cited

U.S. PATENT DOCUMENTS

| | | | | |
|---|---|---|---|---|
| 2006/0293882 | A1* | 12/2006 | Giesbrecht | G10L 15/065 704/204 |
| 2009/0177466 | A1* | 7/2009 | Rui et al. | 704/225 |
| 2010/0296665 | A1 | 11/2010 | Ishikawa et al. | |
| 2012/0163622 | A1* | 6/2012 | Karthik et al. | 381/92 |

FOREIGN PATENT DOCUMENTS

| | | | |
|---|---|---|---|
| JP | A-2004-341339 | | 12/2004 |
| JP | A-2005-195955 | | 7/2005 |
| JP | A-2005-203981 | | 7/2005 |
| JP | A-2006-163231 | | 6/2006 |
| JP | 2006279185 A | * | 10/2006 |
| JP | A-2010-271411 | | 12/2010 |
| JP | A-2011-097335 | | 5/2011 |

* cited by examiner

SIGNAL PROCESSING DEVICE, IMAGING APPARATUS, AND SIGNAL-PROCESSING PROGRAM

CROSS-REFERENCE TO RELATED APPLICATION

Priority is claimed on Japanese Patent Application No. 2011-075457, filed on Mar. 30, 2011, the contents of which are incorporated herein by reference in its entirety.

BACKGROUND

Field of the Invention

The present invention relates to a signal-processing device, an imaging apparatus, and a signal-processing program.

Description of Related Art

In the related art, in order to remove noise mixed in a voice signal, a method is known in which a time domain signal is converted into a frequency domain signal frame by frame, a noise is estimated using a non-voice component signal, and the noise is reduced by subtracting the estimated noise from the frequency domain signal (refer to Japanese Unexamined Patent Application No. 2005-195955).

SUMMARY

However, the method disclosed in Japanese Unexamined Patent Application No. 2005-195955 is to reduce the noise simply by subtracting the estimated noise from the frequency domain signal and therefore has a problem in that the noise cannot always be adequately reduced.

According to an aspect of the present invention, it is desirable to provide a signal-processing device, an imaging apparatus, and a signal-processing program which can adequately reduce noise.

According to an aspect of the present invention, there is provided a signal-processing device including: a determination section that compares a frequency spectrum and a floor spectrum of an input audio signal to each other for each frequency bin and determines whether the input audio signal should be subjected to noise reduction processing or not for each of the frequency bins; and a noise reduction-processing section that subtracts a noise frequency spectrum from the frequency spectrum of the input audio signal for each of the frequency bins on the basis of the result determined by the determination section for each of the frequency bins.

In addition, according to another aspect of the present invention, there is provided an imaging apparatus including the signal-processing device according to the above-described aspect.

In addition, according to still another aspect of the present invention, there is provided a signal-processing program causing a computer as a signal-processing device to execute: a determination process of comparing a frequency spectrum and a floor spectrum of an input audio signal to each other for each frequency bin and determining whether the input audio signal should be subjected to noise reduction processing or not for each of the frequency bins; and a noise reduction process of subtracting a noise frequency spectrum from the frequency spectrum of the input audio signal for each of the frequency bins on the basis of the result determined in the determination process for each of the frequency bins.

According to the aspects of the present invention, an advantage of adequately reducing noise can be exhibited.

DESCRIPTION OF EMBODIMENT

Figure 1:
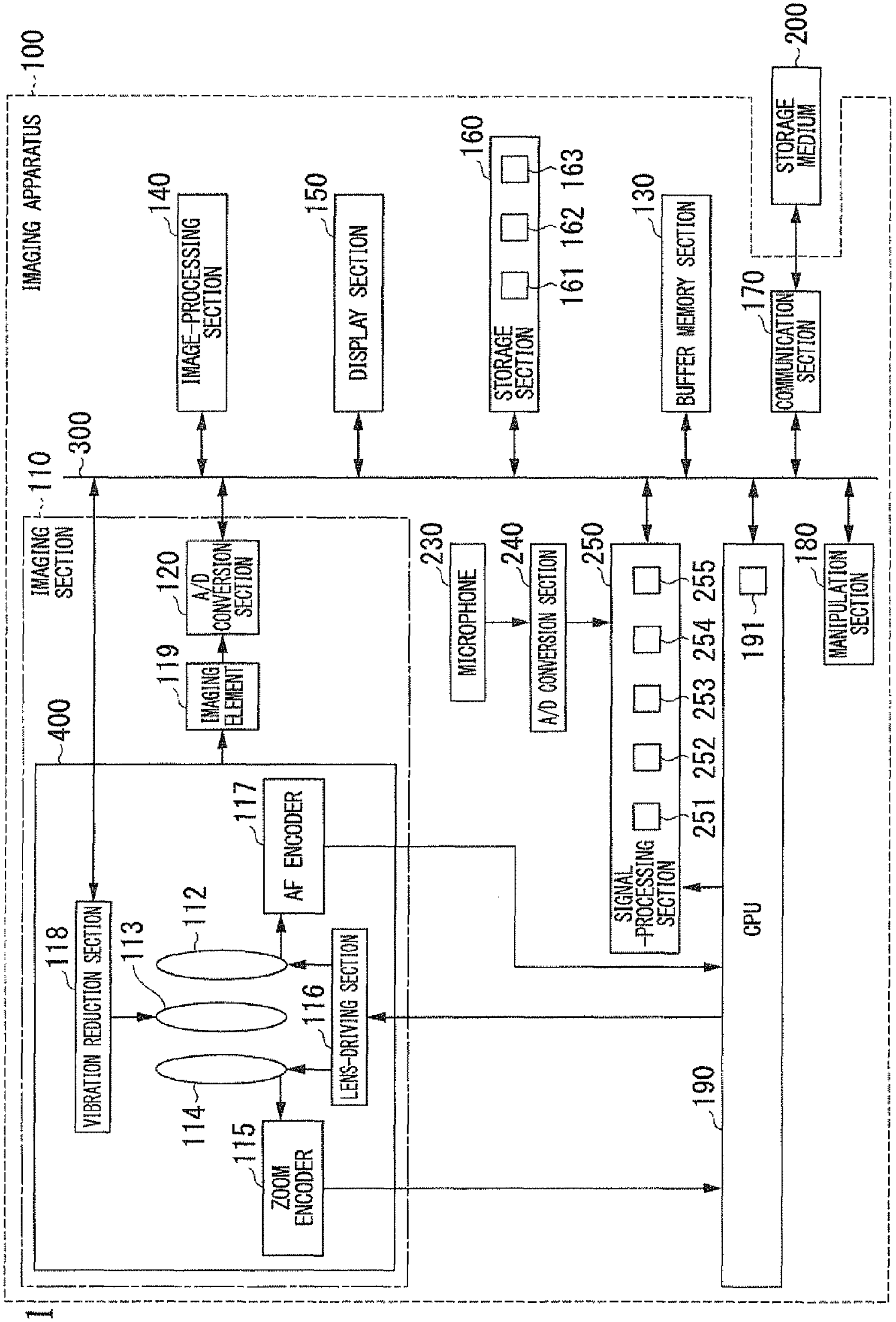
FIG. 1 is a block diagram illustrating a configuration example of an imaging apparatus having a signal-processing device according to an embodiment of the present invention.

Hereinafter, an embodiment of the present invention will be described with reference to the drawings. FIG. 1 is a block diagram schematically illustrating the configuration of an imaging apparatus having a signal-processing device according to the embodiment of the present invention.

As illustrated in FIG. 1, an imaging apparatus 100 according to the present embodiment includes an imaging section 110, a CPU (Central processing unit) 190, a manipulation section 180, an image-processing section 140, a display section 150, a storage section 160, a buffer memory section 130, a communication section 170, a microphone 230, an A/D (Analog/Digital) conversion section 240, a signal-processing section (signal-processing device) 250, and a bus 300. In the configuration of the imaging apparatus 100, for example, the microphone 230, the A/D conversion section 240, and the signal-processing section 250 correspond to a sound recorder. In addition, the signal-processing section 250 corresponds to a signal-processing device.

The imaging section 110 includes an optical system 400, an imaging element 119, and an A/D conversion section 120, is controlled by the CPU 190 in accordance with set imaging conditions (for example, an aperture value and an exposure value) to form an optical image on the imaging element 119 using the optical system 400, and generates image data based on the optical image which is converted into a digital signal by the A/D conversion section 120.

The optical system 400 includes a zoom lens 114, a lens for reducing vibration (hereinafter, referred to as a VR (Vibration Reduction) lens) 113, a lens for adjusting a focal point (hereinafter, referred to as an AF (Auto Focus) lens) 112, a zoom encoder 115, a lens-driving section 116, an AF encoder 117, and a vibration reduction section 118.

The optical system 400 guides the optical image which has been passed through the zoom lens 114, the VR lens 113, and the AF lens 112 to a light-receiving surface of the imaging element 119.

The lens-driving section 116 controls the position of the AF lens 112 or the zoom lens 114 on the basis of a drive control signal input from the CPU 190, which will be described below.

The vibration reduction section 118 controls the position of the VR lens 113 on the basis of the drive control signal input from the CPU 190, which will be described below. The vibration reduction section 118 may detect the position of the VR lens 113.

The zoom encoder 115 detects a zoom position indicating the position of the zoom lens 114 and outputs the detected zoom position to the CPU 190.

The AF encoder 117 detects a focus position indicating the position of the AF lens 112 and outputs the detected zoom position and focus position to the CPU 190.

In addition, the above-described optical system 400 may be integrally attached to the imaging apparatus 100 or may be detachably attached to the imaging apparatus 100.

The imaging element 119 converts, for example, the optical image formed on the light-receiving surface into an electric signal to output to the A/D conversion section 120.

In addition, the imaging element 119 stores image data, which is obtained when a photography instruction is received through the manipulation section 180, in a storage medium 200 through the A/D conversion section 120 or the image-processing section 140 as photography image data of a photographed still image.

On the other hand, for example, in a case where a photography instruction is not received through the manipulation section 180, the imaging element 119 outputs image data, which is continuously obtained, to the CPU 190 and the display section 150 as a through image data via the A/D conversion section 120 or the image-processing section 140.

The A/D conversion section 120 A/D-converts the electric signal which is converted by the imaging element 119 and outputs image data as the converted digital signal.

The manipulation section 180 includes, for example, a power supply switch, a shutter button, and other manipulation keys, receives a manipulation input by a user manipulating the manipulation section, and outputs the manipulation input to the CPU 190.

The image-processing section 140 performs image processing for the image data stored in the buffer memory 130 or the storage medium 200 with reference to image processing conditions stored in the storage section 160.

The display section 150 is a liquid crystal display, for example, and displays image data obtained by the imaging section 110, a manipulation screen, and the like.

The storage section 160 stores determination conditions which are referred to when a scene is determined by the CPU 190, imaging conditions, and the like. The storage section 160 includes a floor spectrum storage section 161, a noise storage section 162, and a mode information storage section 163. The floor spectrum storage section 161 stores a floor spectrum, which will be described below. The noise storage section 162 stores noise, which will be described below.

The mode information storage section 163 stores mode information which is information regarding which mode is selected between a quality-emphasized mode (first mode) which emphasizes the quality of an audio signal input by the manipulation of the user through the manipulation section 180 and a noise reduction-emphasized mode (second mode) which emphasizes reducing noise from the input audio signal.

The quality-emphasized mode described herein represents a mode in which a target sound such as a voice is output as is almost without any change, although the noise thereof is reduced, for example. In addition, the noise reduction-emphasized mode described herein represents a mode in which the noise is reduced as much as possible.

The microphone 230 collects a sound and outputs an audio signal corresponding to the collected sound. The audio signal is an analog signal.

The A/D conversion section 240 converts the audio signal, which is the analog signal input from the microphone 230, into a digital audio signal.

The signal-processing section 250 performs audio signal processing such as noise reduction on the audio signal which is converted into the digital signal by the A/D conversion section 240 and stores the audio signal subjected to the audio signal processing in the storage medium 200. In addition, the signal-processing section 250 performs the audio signal processing such as noise reduction in accordance with the mode information stored in the mode information storage section 163 of the storage section 160. The details of the signal-processing section 250 will be described below.

In addition, the audio signal subjected to audio signal processing by the signal-processing section 250 may be stored in the storage medium 200 to be time-associated with the image data imaged by the imaging element 119 or may be stored therein as a moving image containing the audio signal.

The buffer memory section 130 temporarily stores the image data imaged by the imaging section 110, the audio signal converted by the signal-processing section 250, and the like.

The communication section 170 is connected to the detachable storage medium 200 such as a card memory and stores, reads, or deletes information in or from the storage medium 200.

The storage medium 200 is a storage section detachably connected to the imaging apparatus 100, and stores, for example, the image data generated (photographed) by the imaging section 110 and the audio signal subjected to the audio signal processing by the signal-processing section 250.

The CPU 190 controls the entire imaging apparatus 100, for example, generates the drive control signal which controls the positions of the zoom lens 114 and the AF lens 112 on the basis of the zoom position input from the zoom encoder 115, the focus position input from the AF encoder 117, and the manipulation input which is input from the manipulation section 180. The CPU 190 controls the positions of the zoom lens 114 and the AF lens 112 through the lens-driving section 116 on the basis of the drive control signal.

In addition, the CPU 190 includes a timing detection section 191. The timing detection section 191 detects timing when an operation section included in the imaging apparatus 100 operates.

The operation section described herein represents, for example, the zoom lens 114, the VR lens 113, the AF lens 112, or the manipulation section 180 which is described above, and is a component which generates a sound (or having a possibility of generating a sound) by operating or being operated, in the imaging apparatus 100.

In addition, the operation section has a configuration in which the microphone 230 collects (or has a possibility of collecting) the sound which is generated by the component in the imaging apparatus 100 operating or being operated.

The timing detection section 191 may detect the timing when the operation section operates, on the basis of a control signal which operates the operation section. This control signal is a control signal which causes the operation section to operate the operate section or a control signal which operates the operation section.

For example, in order to drive the zoom lens 114, the VR lens 113, or the AF lens 112, the timing detection section 191 may detect the timing when the operation section operates, on the basis of the drive control signal which is input to the lens-driving section 116 or the vibration reduction section 118 or on the basis of the drive control signal generated by the CPU 190.

In addition, when the CPU 190 generates the drive control signal, the timing detection section 191 may detect the timing when the operation section operates, on the basis of processing or a command which is executed on the CPU 190.

In addition, the timing detection section 191 may detect the timing when the operation section operates, on the basis of a signal which is input from the manipulation section 180 and indicates that the zoom lens 114 or the AF lens 112 is to be driven.

In addition, the timing detection section 191 may detect the timing when the operation section operates, on the basis of a signal indicating that the operation section is operated.

For example, the timing detection section 191 may detect the timing when the operation section operates by detecting that the zoom lens 114 or the AF lens 112 is driven on the basis of the output from the zoom encoder 115 or the AF encoder 117.

In addition, the timing detection section 191 may detect the timing when the operation section operates by detecting that the VR lens 113 is driven on the basis of the output from the vibration reduction section 118.

In addition, the timing detection section 191 may detect the timing when the operation section operates by detecting that the manipulation section 180 is manipulated on the basis of the input from the manipulation section 180.

In addition, the timing detection section 191 detects the timing when the operation section included in the imaging apparatus 100 operates, and outputs the signal indicating the detected timing to the signal-processing section 250 (refer to FIG. 2, which will be described below).

The bus 300 is connected to the imaging section 110, the CPU 190, the manipulation section 180, the image-processing section 140, the display section 150, the storage section 160, the buffer memory section 130, the communication section 170, and the signal-processing section 250, and transmits data output from the respective sections and the like.

<Specific Configuration of Signal-Processing Section 250>

Next, the details of the signal-processing section 250 illustrated in FIG. 1 will be described with reference to FIGS. 2 to 6. The signal-processing section 250 illustrated in FIG. 1 includes a floor spectrum estimation section 251, a noise estimation section 252, a determination section 253, a noise reduction-processing section 254, and a substitution section 255.

Here, a case will be described in which the signal which is input from the timing detection section 191 and indicates the timing and the audio signal which is converted into the digital signal by the A/D conversion section 240 are input to the signal-processing section 250 illustrated in FIG. 2. In FIG. 2, in order from the upper area to the lower area, (a) represents the signal which is input from the timing detection section 191 and indicates the timing, that is, the signal which indicates the timing when the operation section operates, (b) represents a time, (c) represents a frame No., and (d) represents the waveform of the audio signal input from the A/D conversion section 240.

Figure 2:
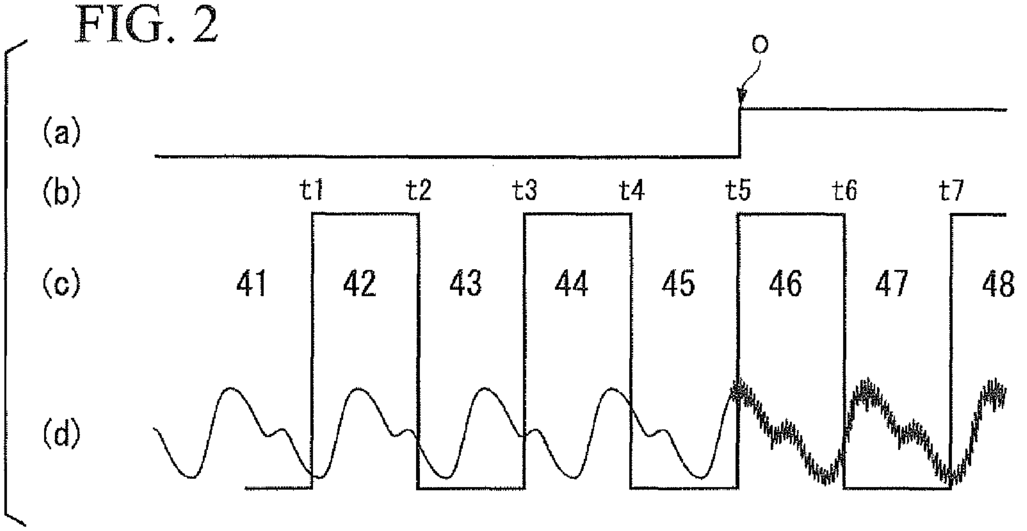
FIG. 2 is a diagram illustrating an operation example when an audio signal is recorded by an imaging apparatus.

In FIG. 2, the horizontal axis represents the time axis and the vertical axis represents a voltage, a time, and a frame No. of each signal, for example. In addition, as illustrated in (d) of FIG. 2, in the case of the audio signal where voices are collected, for example, there are relatively many repetitive signals within a short period of time such as about several tens of milliseconds.

In the example illustrated in FIG. 2, in the relationship between the frame and the time, the period up to the time t1 corresponds to the frame No. 41, the period from the time t1 to the time t2 corresponds to the frame No. 42, the period from the time t2 to the time t3 corresponds to the frame No. 43, the period from the time t3 to the time t4 corresponds to the frame No. 44, the period from the time t4 to the time t5 corresponds to the frame No. 45, the period from the time t5 to the time t6 corresponds to the frame No. 46, the period from the time t6 to the time t7 corresponds to the frame No. 47, and the period after the time t7 corresponds to the frame No. 48. Here, the time length of each frame is the same.

In addition, in the example illustrated in FIG. 2, before the time t5 after the time t4, the signal (a) which is input from the timing detection section 191 and indicates the timing is shifted from a low level to a high level (refer to Symbol O in FIG. 2). Here, the low level represents that the operation section does not operate and the high level represents that the operation section operates. As described above, in the example illustrated in FIG. 2, before the time t5 after the time t4, the state where the operation section does not operate is shifted into the state where the operation section operates.

In response to such an operation of the operation section, after the midway section of the frame No. 45, noise is superimposed on the waveform (d) of the audio signal input from the A/D conversion section 240. Here, when focusing on the relationship between each frame and a noise occurrence zone, it can be seen that noise is collected on frames subsequent to frame No. 45 (46, 47, 48, and . . . ) on the basis of the fact that the detected signal rises midway through the frame No. 45. In addition, before the frame No. 44 (43, 42, 41, and . . . ), noise is not collected at all. After the frame No. 46 (46, 47, 48, and . . . ), noise is collected in the entire frame zone.

In the present embodiment, the following configuration has been described: the signal-processing section 250 divides the audio signal, which is converted into the digital signal by the A/D conversion section 240, into frames, performs Fourier transform on the audio signal of each of the divided frames, and generates a frequency spectrum of the audio signal in each of the frames; the signal-processing section 250 performs noise reduction processing on the frequency spectrum of the audio signal for each of the frames, as will be described below with reference to FIGS. 2 to 6; and then, the signal-processing section 250 performs inverse Fourier transform on the frequency spectrum of the audio signal, which has been subjected to the noise reduction processing, in each of the frames to store in the storage medium 200.

The floor spectrum estimation section 251 estimates a floor spectrum from the audio signal, which is converted into the digital signal by the A/D conversion section 240, on the basis of the timing when the operation section operates which is detected by the timing detection section 191. The floor spectrum represents a frequency spectrum of an audio signal in a frame immediately before the timing when the operation section operates or represents a frequency spectrum of an audio signal in a period where the operation section does not operate. In addition, the floor spectrum estimation section 251 stores the estimated floor spectrum in the floor spectrum storage section 161.

For example, the floor spectrum estimation section 251 estimates as the floor spectrum the frequency spectrum of the audio signal in the frame immediately before the timing when the operation section operates, on the basis of the timing when the operation section operates which is detected by the timing detection section 191. In FIG. 2, the floor spectrum estimation section 251 estimates the frequency spectrum of the audio signal in the frame No. 44 as the floor spectrum. In addition, the floor spectrum estimation section 251 stores the frequency spectrum of the audio signal in the frame No. 44, in the floor spectrum storage section 161 as the floor spectrum.

In the following description, the frequency spectrum (=S44) of the audio signal in the frame No. 44 will be referred to as the floor spectrum FS. In addition, in the following description, the intensity values of the respective frequency bins (the respective frequency domains) in the floor spectrum FS will be respectively referred to as F1, F2, F3, F4, and F5 in order from low frequency to high frequency (refer to (a) of FIG. 3).

The noise estimation section 252 estimates noise from the audio signal which is converted into the digital signal by the A/D conversion section 240, on the basis of the timing when the operation section operates which is detected by the timing detection section 191. In addition, the noise estimation section 252 stores the estimated noise in the noise storage section 162.

For example, the noise estimation section 252 estimates as a noise frequency spectrum (noise spectrum) the difference between the frequency spectrum of the audio signal in the frame immediately after the timing when the operation section operates (and in the frame where the operation section operates across the entire frame) and the frequency spectrum of the audio signal in the frame immediately before the timing when the operation section operates (and in the frame where the operation section does not operate across the entire frame), on the basis of the timing when the operation section operates which is detected by the timing detection section 191.

Figure 3:
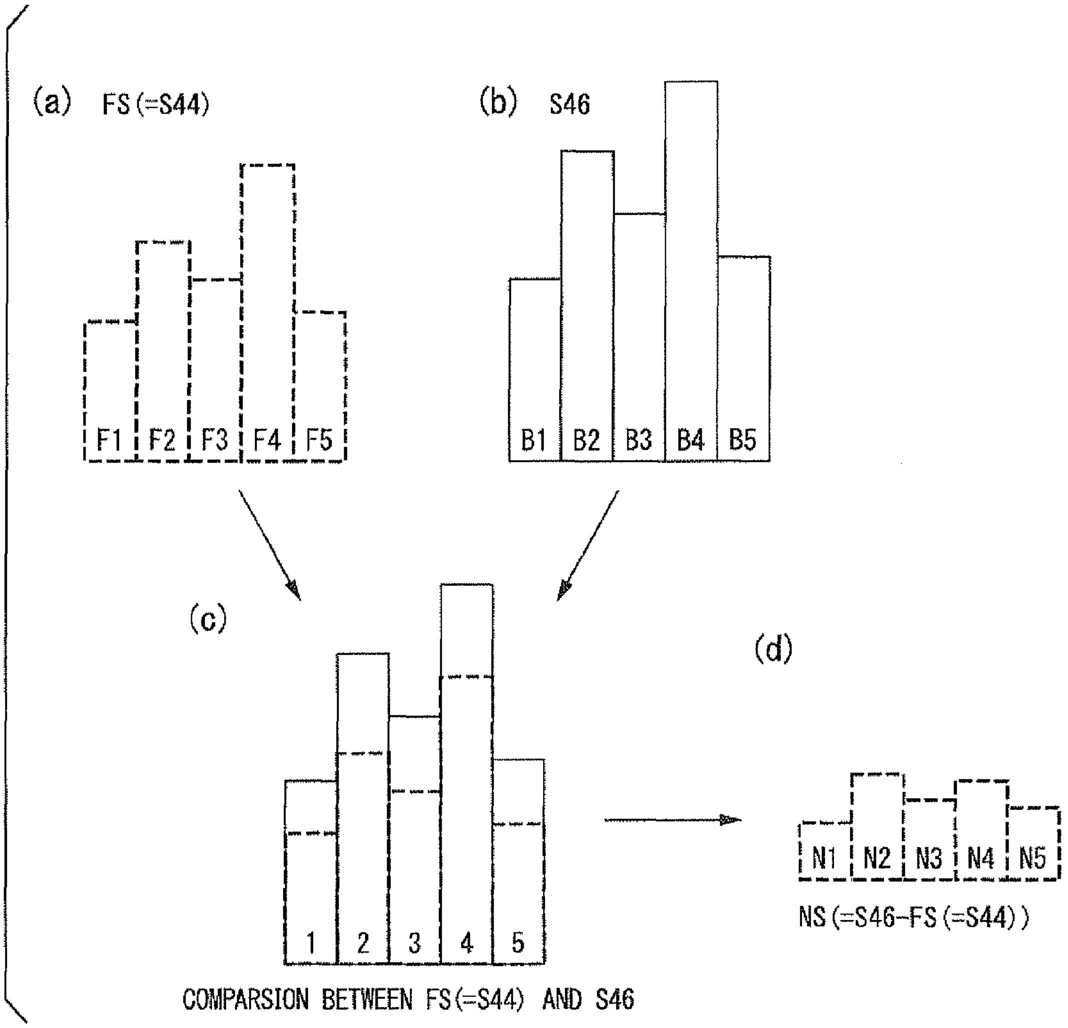
FIG. 3 is a diagram illustrating an example when a floor spectrum estimation section and a noise estimation section of a signal-processing section calculate a floor spectrum and noise.

In FIG. 2, the noise estimation section 252 subtracts the frequency spectrum S44 of the audio signal in the frame No. 44 (that is, the floor spectrum FS; refer to (a) of FIG. 3) from the frequency spectrum S46 (refer to (b) of FIG. 3) of the audio signal in the frame No. 46 for each of the frequency bins.

In the following description, the frequency spectrum of the audio signal in the frame No. 46 will be referred to as the frequency spectrum S46 (refer to (b) of FIG. 3). In addition, in the following description, the intensity values of the respective frequency bins in the frequency spectrum S46 will be respectively referred to as B1, B2, B3, B4, and B5 in order from low frequency to high frequency (refer to (b) of FIG. 3).

The noise estimation section 252 estimates the frequency spectrum calculated by the subtraction as the noise frequency spectrum ((d) of FIG. 3). In addition, the noise estimation section 252 stores the estimated noise in the noise storage section 162.

Hereinafter, the noise frequency spectrum estimated by the noise estimation section 252 will be referred to as a noise NS. In addition, the intensity values of the respective frequency bins in the noise NS will be respectively referred to as N1, N2, N3, N4, and N5 in order from low frequency to high frequency (refer to (d) of FIG. 3).

The noise frequency spectrum thus obtained is subtracted from the frequency spectrum in the frame containing the noise (for example, frame No. 46, 47, 48, and . . . ). By converting the subtracted result into a time domain, the noise in the frame containing the noise is reduced (eliminated).

That is, the signal-processing section 250 performs spectral subtraction processing on the audio signal on the basis of the noise frequency spectrum, thereby reducing the noise of the audio signal. First, the spectral subtraction processing is a method of reducing the noise of the audio signal by converting the audio signal into the frequency domain by Fourier transform and the noise is reduced in the frequency domain, followed by inverse Fourier transform.

In addition, the signal-processing section 250 may perform Fast Fourier Transform (FFT) or Inverse Fast Fourier Transform (IFFT) as the Fourier transform or the inverse Fourier transform.

Referring to FIG. 1 again, the respective configurations of the signal-processing section 250 will be described. Here, in the following description, it is assumed that the floor spectrum and the noise described with reference to FIGS. 2 and 3 are estimated by the floor spectrum estimation section 251 and the noise estimation section 252 or are stored in advance in the floor spectrum storage section 161 and the noise storage section 162.

<Quality-Emphasized Mode>

First, the respective configurations of the signal-processing section 250 in the quality-emphasized mode will be described with reference to FIGS. 4 and 5. Here, a case in which the signal-processing section 250 performs the noise reduction processing on the audio signal in the frame No. 46 will be described.

The determination section 253 compares the frequency spectrum and the floor spectrum to each other of the input audio signal for each of the spectrum bins and determines whether the input audio signal should be subjected to the noise reduction processing or not for each of the frequency bins. "The frequency spectrum of the input audio signal" described herein represents a frequency spectrum in which the audio signal converted into the digital signal by the A/D conversion section 240 is divided into the frames by the signal-processing section 250 and the audio signal in each of the frames is further Fourier-transformed into the frequency spectrum.

Figure 4:
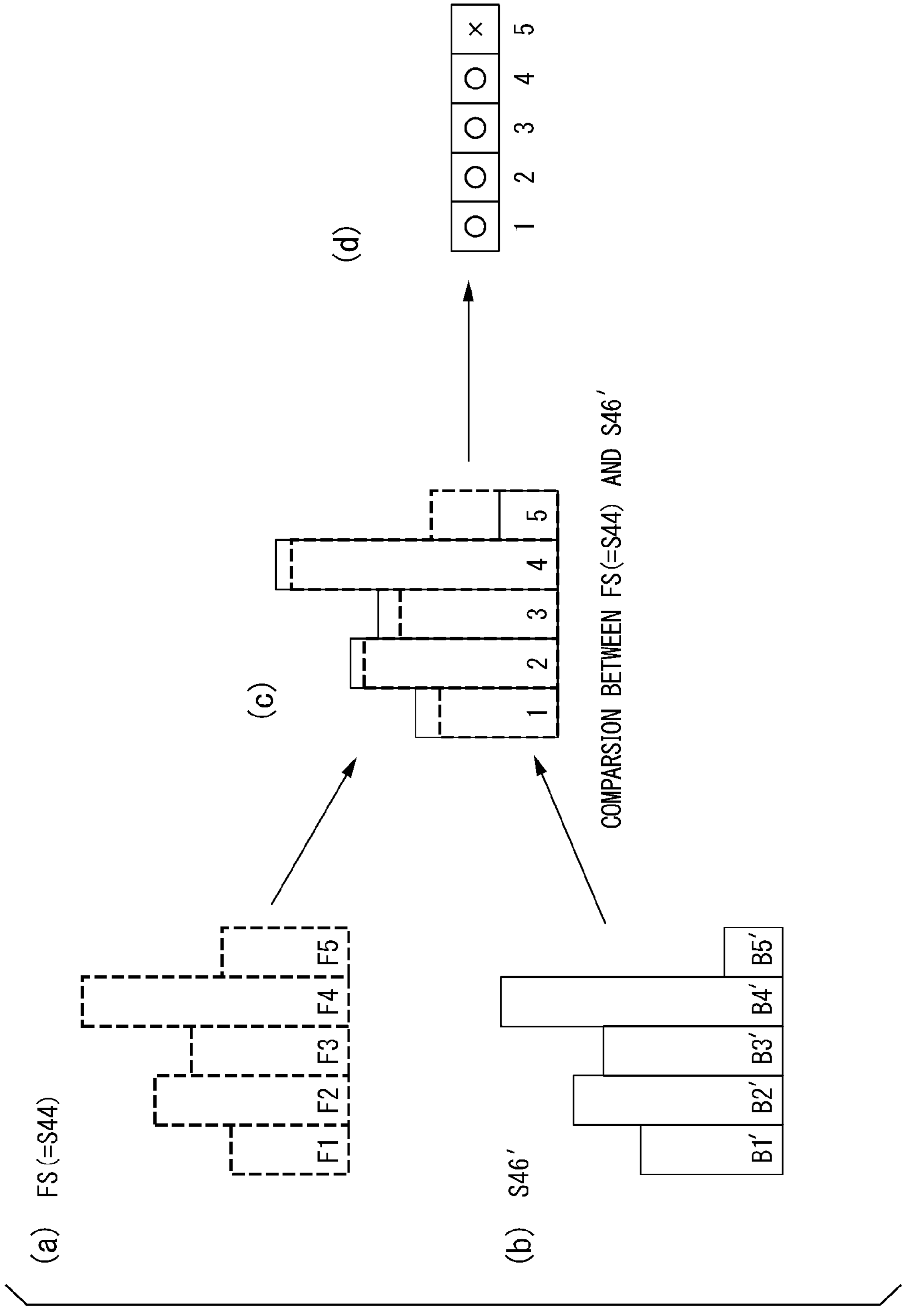
FIG. 4 is a first diagram illustrating an example when a signal-processing section performs noise reduction processing in a quality-emphasized mode.

For example, the determination section 253 compares the frequency spectrum (frequency spectrum in the frame No. 46; refer to (b) of FIG. 4) and the floor spectrum FS (refer to (a) of FIG. 4) of the input audio signal to each other for each of the frequency bins (refer to (c) of FIG. 4).

Here, with respect to a frequency bin where the frequency spectrum of the input audio signal (frequency spectrum in the frame No. 46; refer to (b) of FIG. 4) is larger than the floor spectrum FS (refer to (a) of FIG. 4), the determination section 253 determines that the input audio signal in the frequency bin should be subjected to the noise reduction processing.

On the other hand, with respect to a frequency bin where the frequency spectrum of the input audio signal (frequency spectrum in the frame No. 46; refer to (b) of FIG. 4) is equal to or smaller than the floor spectrum FS (refer to (a) of FIG. 4), the determination section 253 determines that the input audio signal in the frequency bin should not be subjected to the noise reduction processing.

In the frequency bin Nos. 1 to 4 illustrated in (a) and (b) of FIG. 4, the frequency spectrum S46 in the frame No. 46 (refer to (b) of FIG. 4) is larger than the floor spectrum FS (refer to (a) of FIG. 4). In the frequency bin No. 5, the frequency spectrum S46 in the frame No. 46 (refer to (b) of FIG. 4) is equal to or smaller than the floor spectrum FS (refer to (a) of FIG. 4).

Therefore, the determination section 253 determines that the input audio signal in the frequency bin Nos. 1 to 4 should be subjected to the noise reduction processing (refer to four Symbols O indicated from the low frequency side (left side) in (d) of FIG. 4). In addition, the determination section 253 determines that the input audio signal in the frequency bin No. 5 should not be subjected to the noise reduction processing (refer to Symbol X indicated on the highest frequency side (rightmost side) in (d) of FIG. 4).

<Noise Reduction-Processing Section 254>

In the quality-emphasized mode, the noise reduction-processing section 254 subtracts the noise frequency spectrum from the frequency spectrum of the input audio signal for each of the frequency bins, on the basis of the result determined by the determination section 253 for each of the frequency bins.

For example, in the quality-emphasized mode, with respect to a frequency bin where the determination section 253 determines that the input audio signal should be subjected to the noise reduction processing, the noise reduction-processing section 254 subtracts the noise frequency spectrum from the frequency spectrum of the input audio signal.

In addition, in the quality-emphasized mode, with respect to a frequency bin where the determination section 253 determines that the input audio signal should not be subjected to the noise reduction processing, the noise reduction-processing section 254 outputs the frequency spectrum of the input audio signal as is.

Based on the result determined by the determination section 253 (refer to (d) of FIG. 4), the noise reduction-processing section 254 subtracts the corresponding noise frequency spectrum from the frequency spectrum of the audio signal in each of the frequency bin Nos. 1 to 4 of the frame No. 46. In addition, based on the result determined by the determination section 253 (refer to (d) of FIG. 4), the noise reduction-processing section 254 outputs as is the frequency spectrum of the audio signal in the frequency bin No. 5 of the frame No. 46.

Figure 5:
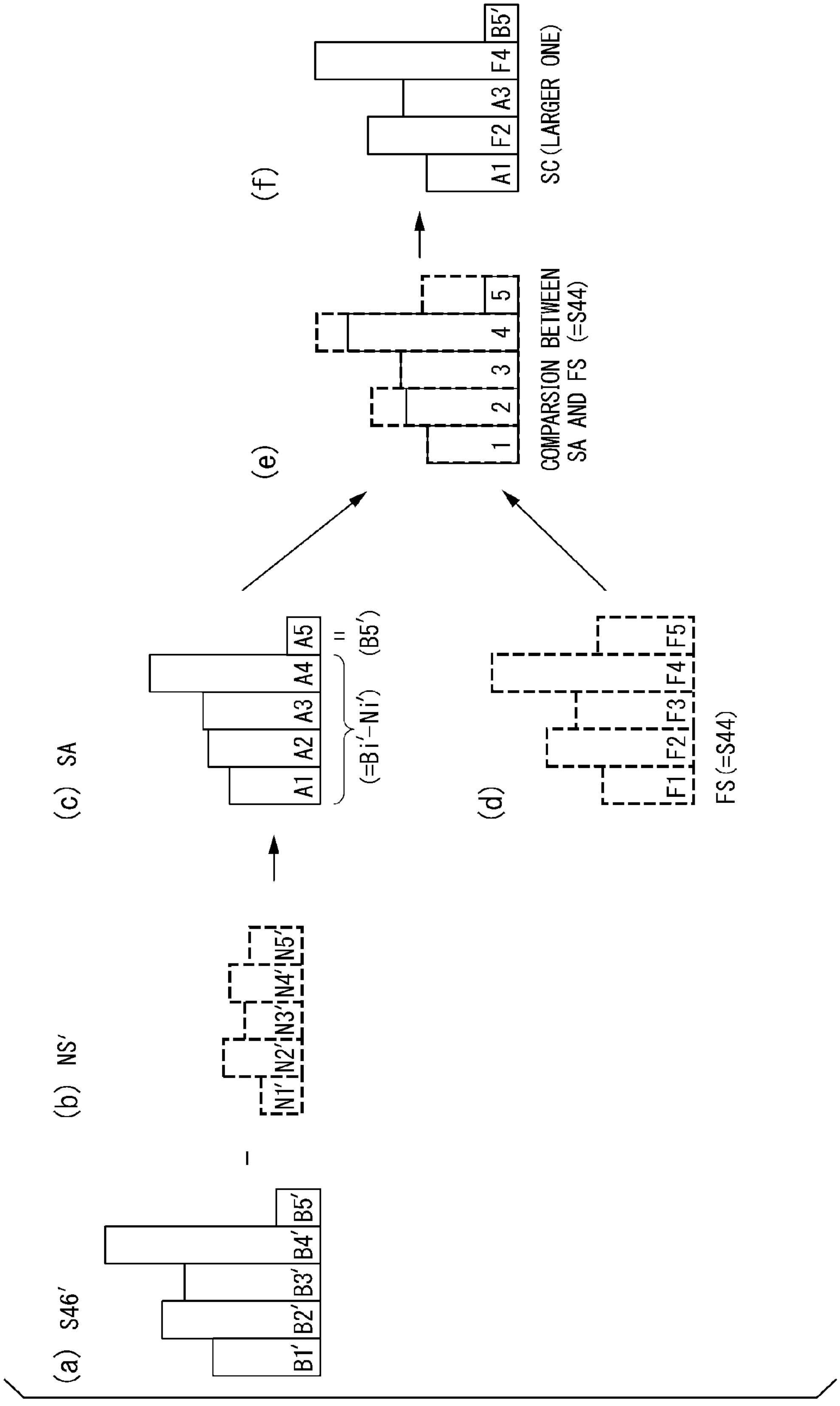
FIG. 5 is a second diagram illustrating an example when a signal-processing section performs noise reduction processing in a quality-emphasized mode.

Accordingly, the noise reduction-processing section 254 calculates a frequency spectrum SA with the intensity values of A1 (=B1-N1), A2 (=B2–N2), A3 (=B3–N3), A4 (=B4–N4), and A5 (=B5) in order from the frequency bin Nos. 1 to 5 (refer to (c) of FIG. 5).

In the quality-emphasized mode, the substitution section 255 selects a candidate frequency bin for substitution among the frequency bins of the frequency spectrum subtracted by the noise reduction-processing section 254, on the basis of the result determined by the determination section 253 for each of the frequency bins. Next, the substitution section 255 compares the frequency spectrum subtracted by the noise reduction-processing section 254 for each of the frequency bins and the floor spectrum to each other for each of the frequency bins in the selected frequency bin. Then, with respect to a frequency bin where the floor spectrum has an intensity value larger than that of the frequency spectrum subtracted by the noise reduction-processing section 254, the substitution section 255 substitutes the frequency spectrum subtracted by the noise reduction-processing section 254 with the floor spectrum.

For example, in the quality-emphasized mode, the substitution section 255 selects the frequency bin Nos. 1 to 4 as candidate frequency bins for substitution among the frequency bins of the frequency spectrum SA (refer to (c) of FIG. 5) subtracted by the noise reduction-processing section 254, on the basis of the result (refer to (d) of FIG. 4) determined by the determination section 253 for each of the frequency bins.

Next, the substitution section 255 compares the frequency spectrum SA (refer to (c) of FIG. 5) subtracted by the noise reduction-processing section 254 for each of the frequency bins and the floor spectrum FS (refer to (d) of FIG. 5) to each other for each of the frequency bins in the frequency bin Nos. 1 to 4 as the selected frequency bins (refer to (e) of FIG. 5). In addition, in (e) of FIG. 5, the frequency spectrum SA and the floor spectrum FS are compared to each other for each of all the frequency bins.

Then, with respect to a frequency bin where the floor spectrum FS has an intensity value larger than that of the frequency spectrum SA subtracted by the noise reduction-processing section 254, the substitution section 255 substitutes the frequency spectrum SA subtracted by the noise reduction-processing section 254 with the floor spectrum FS. In this case, the substitution section 255 substitutes the frequency spectrum SA with the floor spectrum FS in the frequency bin Nos. 2 and 4. Accordingly, the substitution section 255 calculates a frequency spectrum SC with the intensity values of A1, F2, A3, F4, and B5 in order from the frequency bin Nos. 1 to 5 (refer to (f) of FIG. 5).

Thereafter, the signal-processing section 250 performs inverse Fourier transform on the frequency spectrum SC illustrated in (f) of FIG. 5 to obtain the noise-reduced audio signal and stores the audio signal in the storage medium 200 through the communication section 170. The signal-processing section 250 may store the audio signal in the storage medium 200 to be time-associated with the image data imaged by the imaging element 119.

As described above with reference to FIGS. 4 and 5, the signal-processing section 250 can output a target sound as is almost without any change, although the noise thereof is reduced. That is, as described above with reference to FIGS. 4 and 5, the signal-processing section 250 can adequately reduce the noise according to the quality-emphasized mode.

<Noise Reduction-Emphasized Mode>

Next, the respective configurations of the signal-processing section 250 in the noise reduction-emphasized mode will be described with reference to FIG. 6. Here, similar to the cases in FIGS. 4 and 5, a case in which the signal-processing section 250 performs the noise reduction processing on the audio signal in the frame No. 46 will be described.

In the noise reduction-emphasized mode, the noise reduction-processing section 254 subtracts the noise frequency spectrum from the frequency spectrum of the input audio signal for each of the frequency bins.

Figure 6:
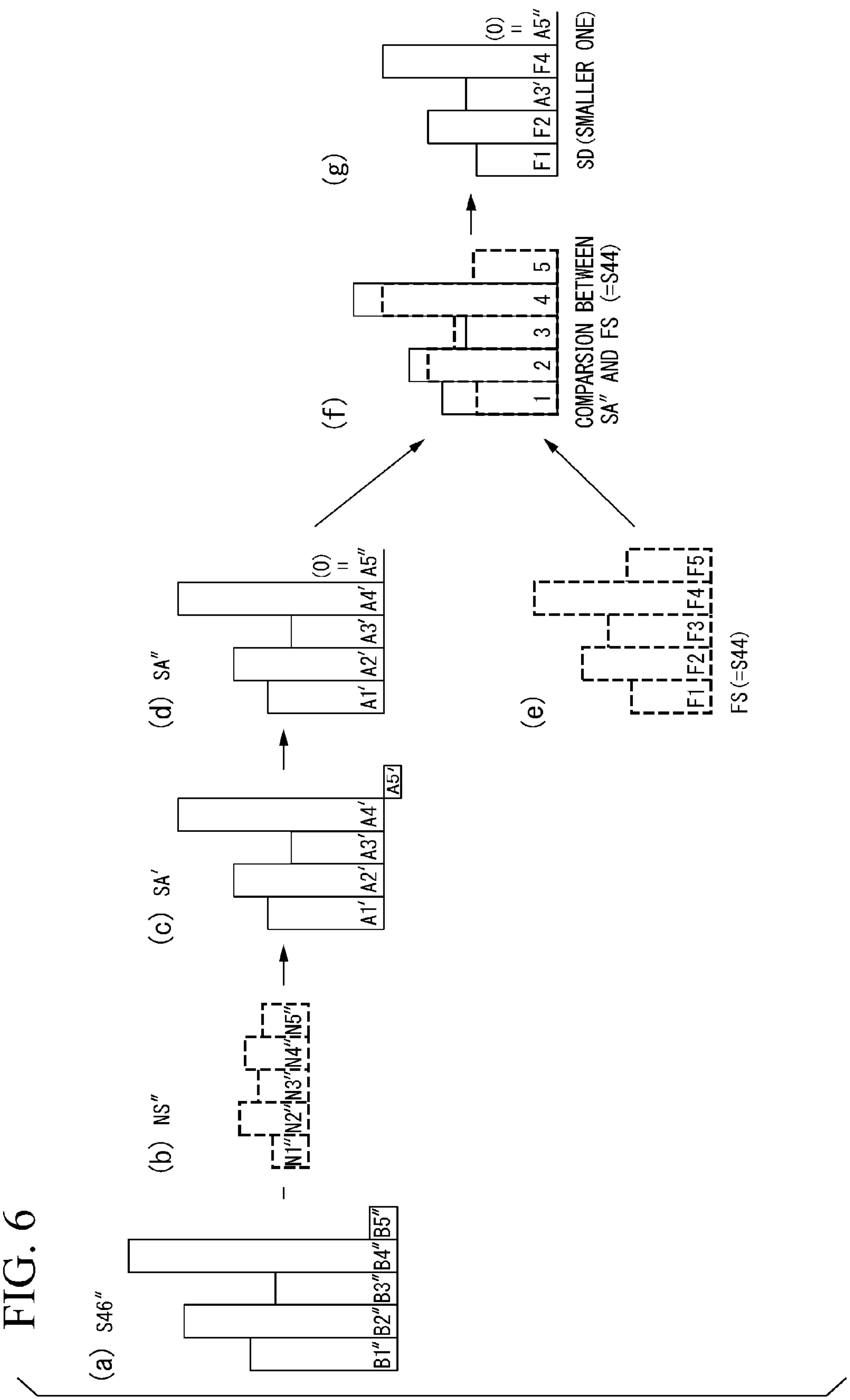
FIG. 6 is a diagram illustrating an example when a signal-processing section performs noise reduction processing in a noise reduction-emphasized mode.

For example, in the noise reduction-emphasized mode, the noise reduction-processing section 254 subtracts the noise frequency spectrum NS (refer to (b) of FIG. 6) from the frequency spectrum S46 (refer to (a) of FIG. 6) in the frame No. 46 as the frequency spectrum of the input audio signal for each of the frequency bins. By this subtraction, the noise reduction-processing section 254 calculates the frequency spectrum SA (refer to (c) of FIG. 6).

The frequency spectrum SA illustrated in (c) of FIG. 6 has the intensity values of A1 (=B1–F1), A2 (=B2–F2), A3 (=B3–F3), A4 (=B4–F4), and A5 (=B5–F5) in order from the frequency bin Nos. 1 to 5.

In the example illustrated in (a) and (b) of FIG. 6, the frequency spectrum S46 has the intensity values larger than those of the noise frequency spectrum NS in the frequency bin Nos. 1 to 4 and the frequency spectrum S46 has the intensity value smaller than that of the noise frequency spectrum NS in the frequency bin No. 5.

Therefore, in the frequency spectrum SA calculated by the noise reduction-processing section 254, the intensity values of A1, A2, A3, and A4 in the frequency bin Nos. 1 to 4 are positive (plus) values and the intensity value A5 in the frequency bin No. 5 is a negative (minus) value.

Here, in the noise reduction-emphasized mode, when the result of subtracting the noise frequency spectrum from the frequency spectrum of the input audio signal for each of the frequency bins is a negative value, the noise reduction-processing section 254 changes the result to 0.

For example, in the example illustrated in (c) of FIG. 6, the intensity value A5 in the frequency bin No. 5 is a negative (minus) value. Therefore, the noise reduction-processing section 254 changes (refer to (d) of FIG. 6) the intensity value A5 of the frequency bin No. 5 to 0 (zero). Here, in the following description, the frequency spectrum in which the intensity value A5 of the frequency bin No. 5 is changed to 0 (zero) will be referred to as the frequency spectrum SN.

Next, in the noise reduction-emphasized mode, the substitution section 255 compares the frequency spectrum SN (refer to (d) of FIG. 6) subtracted by the noise reduction-processing section 254 for each of the frequency bins and the floor spectrum FS (refer to (e) of FIG. 6) to each other for each of the frequency bins (refer to (f) of FIG. 6).

Then, with respect to a frequency bin where the floor spectrum FS (refer to (e) of FIG. 6) has an intensity value smaller than that of the frequency spectrum SN (refer to (d) of FIG. 6) subtracted by the noise reduction-processing section 254, the substitution section 255 substitutes the frequency spectrum SA' (refer to (d) of FIG. 6) subtracted by the noise reduction-processing section 254 with the floor spectrum FS (refer to (e) of FIG. 6).

In (f) of FIG. 6, in the frequency bin Nos. 1, 2, and 4, the frequency spectrum SN (refer to (d) of FIG. 6) subtracted by the noise reduction-processing section 254 has an intensity value smaller than that of the floor spectrum FS (refer to (e) of FIG. 6). In addition, in the frequency bin Nos. 3 and 5, the frequency spectrum SN (refer to (d) of FIG. 6) subtracted by the noise reduction-processing section 254 has an intensity value equal to or larger than that of the floor spectrum FS (refer to (e) of FIG. 6).

Therefore, the substitution section 255 substitutes the intensity values only in the frequency bin Nos. 1, 2, and 4 among the frequency bins of the frequency spectrum SA' (refer to (d) of FIG. 6) subtracted by the noise reduction-processing section 254, with those in the frequency bins of the floor spectrum FS (refer to (e) of FIG. 6). In this way, the substitution section 255 calculates a frequency spectrum SD with the intensity values of F1, F2, A3, F4, and A5 (=0) in order from the frequency bin Nos. 1 to 5 (refer to (g) of FIG. 6).

Thereafter, similar to the case of the frequency spectrum SC illustrated in (f) of FIG. 5, the signal-processing section 250 performs inverse Fourier transform on the frequency spectrum SD illustrated in (g) of FIG. 6 to obtain the noise-reduced audio signal and stores the audio signal in the storage medium 200 through the communication section 170.

As described above with reference to FIG. 6, the signal-processing section 250 can reduce the noise as much as possible. That is, as described above with reference to FIG. 6, the signal-processing section 250 can adequately reduce the noise according to the noise reduction-emphasized mode.

As described above with reference to FIGS. 1 to 6, the signal-processing section 250 according to the present embodiment changes the method of noise reduction processing for the audio signal according to a mode which is selected and set by a user between the quality-emphasized mode and the noise reduction-emphasized mode. Accordingly, as described above with reference to FIGS. 4, 5, and 6, the signal-processing section 250 according to the present embodiment can adequately reduce the noise from the audio signal according to the quality-emphasized mode and the noise reduction-emphasized mode.

In addition, in either case of the quality-emphasized mode or the noise reduction-emphasized mode, the substitution section 255 of the signal-processing section 250 according to the present embodiment substitutes the frequency spectrum subtracted by the noise reduction-processing section 254 for each of the frequency bins with the floor spectrum for each of the frequency bins, on the basis of the result of comparing the frequency spectrum subtracted by the noise reduction-processing section 254 for each of the frequency bins and the floor spectrum to each other for each of the frequency bins (refer to (e) and (f) of FIG. 5 and (f) and (g) of FIG. 6).

In addition, when the noise is subtracted from the audio signal, there is a possibility of generating musical noise. On the other hand, as described above, the substitution section 255 of the signal-processing section 250 subtracts the noise from the audio signal and then performs so-called flooring processing on the basis of the result of comparing with the floor spectrum. Accordingly, the substitution section 255 of the signal-processing section 250 can reduce the possibility of generating musical noise.

In addition, the substitution section 255 of the signal-processing section 250 does not simply perform the flooring processing but performs the flooring processing according to the quality-emphasized mode and the noise reduction-emphasized mode (refer to (e) and (f) of FIG. 5 and (f) and (g) of FIG. 6). Accordingly, while satisfying the conditions of emphasizing the quality or the noise reduction, the possibility of generating musical noise can be preferably reduced in either case.

In addition, the noise reduction-processing section 254 does not simply subtract the noise frequency spectrum from the frequency spectrum of the input audio signal for each of the frequency bins but subtracts the noise frequency spectrum from the frequency spectrum of the input audio signal for each of the frequency bin on the basis of the result determined by the determination section 253 for each of the frequency bins. Accordingly, the noise reduction-processing section 254 can adequately reduce the noise from the input audio signal.

<Regarding Processes after Frame No. 47 in FIG. 2>

In the above description with reference to FIGS. 3 to 6, the case in which the signal-processing section 250 performs the noise reduction processing on the audio signal in the frame No. 46 is described. Similar to the case of the audio signal in the frame No. 46, the signal-processing section 250 can perform the noise reduction processing on the audio signals in the frame Nos. 47, 48 and . . . which are the audio signals after the frame No. 46.

For example, in the case of the audio signal in the frame No. 47 and the quality-emphasized mode, the signal-processing section 250 changes the frequency spectrum S46 in the frame No. 46 illustrated in (b) of FIG. 4 and (a) of FIG. 5 to the frequency spectrum S47 in the frame No. 47. In addition, similar to the case of the frequency spectrum S46, the signal-processing section 250 performs the signal processing on the frequency spectrum S47 as described above with reference to FIGS. 4 and 5.

In addition, for example, in the case of the audio signal in the frame No. 47 and the noise reduction-emphasized mode, the signal-processing section 250 changes the frequency spectrum S46 in the frame No. 46 illustrated in (a) of FIG. 6 to the frequency spectrum S47 in the frame No. 47. In addition, similar to the case of the frequency spectrum S46, the signal-processing section 250 performs the signal processing on the frequency spectrum S47 as described above with reference to FIG. 6.

In this way, similar to the case of the frame No. 46, the signal-processing section 250 can perform the noise reduction processing on the audio signals in the frame Nos. 47, 48, and . . . which are the audio signals after the frame No. 46 in either case of the quality-emphasized mode or the noise reduction-emphasized mode.

<Regarding Estimation of Floor Spectrum>

In the above description with reference to FIGS. 2 and 3, the floor spectrum estimation section 251 estimates the frequency spectrum of the audio signal in the frame No. 44 as the floor spectrum. However, the method of estimating the floor spectrum using the floor spectrum estimation section 251 is not limited thereto.

For example, the floor spectrum estimation section 251 respectively converts the audio signals in plural frames before the timing when the operation section operates into the frequency spectra, on the basis of the timing when the operation section operates which is detected by the timing detection section 191. Furthermore, the floor spectrum estimation section 251 may estimate the average frequency spectrum, which is obtained by averaging the plural frequency spectra for each of the frequency bins, as the floor spectrum.

In addition, when the plural frequency spectra are averaged for each of the frequency bins, the floor spectrum estimation section 251 may weight the plural frequency spectra to calculate the average. The weighted value may be lowered as the frequency spectrum becomes distant from a frame (start frame) of an audio signal as a target of the flooring processing.

In addition, when the floor spectrum is estimated, the floor spectrum estimation section 251 desirably estimates the floor spectrum at least on the basis of the frames after the timing when the operation section has operated immediately before. This is because the frequency spectrum of the audio signal in the frame where the operation section does not operate is desirable as the floor spectrum. In addition, this is also because the frame of the audio signal generating the floor spectrum is less appropriate for the floor spectrum with respect to the audio signal as it becomes temporally distant from the audio signal as the target to be subjected to the flooring processing.

In addition, the floor spectrum storage section 161 may store the floor spectrum in advance. For example, the floor spectrum storage section 161 may store the floor spectrum in advance to be associated with environment information indicating the surrounding sound circumstances during photographing or photography mode information indicating a photography mode, according to the situation. The signal-processing section 250 may read out the floor spectrum which is associated with the environment information or photography mode information selected by a user from the floor spectrum storage section 161, and may perform the noise reduction processing described above with reference to FIGS. 3 to 6 on the basis of the read-out floor spectrum.

<Regarding Estimation of Noise>

In addition, in the above description with reference to FIGS. 2 and 3, the noise estimation section 252 subtracts the frequency spectrum (that is, the floor spectrum FS; refer to (a) of FIG. 3) of the audio signal in the frame No. 44 from the frequency spectrum S46 (refer to (b) of FIG. 3) of the audio signal in the frame No. 46 for each of the frequency bins to estimate the noise frequency spectrum. However, the method of the noise estimation section 252 estimating the noise frequency spectrum is not limited thereto.

Instead of the floor spectrum FS which is the frequency spectrum of the audio signal in the frame No. 44, the noise estimation section 252 can estimate the floor spectrum FS by an arbitrary method in which the above-described floor spectrum estimation section 251 estimates the floor spectrum FS.

In addition, instead of the frequency spectrum S46 of the audio signal in the frame No. 46, the noise estimation section 252 may use the frequency spectrum which is obtained by averaging the frequency spectra of the audio signals in the plural frames for each of the frequency bins at the timing when the operation section operates on the basis of the timing when the operation section operates which is detected by the timing detection section 191. For example, instead of the frequency spectrum S46 of the audio signal in the frame No. 46, the noise estimation section 252 may use the frequency spectrum which is obtained by averaging the frequency spectra of the audio signals in the plural frames, such as the frame Nos. 46, 47, and 48, for each of the frequency bins.

In addition, when the plural frequency spectra are averaged for each of the frequency bins, the noise estimation section 252 may weight the frequency spectra to calculate the average. The weighted value may be lowered as the frequency spectrum becomes distant from a frame (start frame) of an audio signal as a target of the flooring processing. In addition, similar to the case of the floor spectrum, the noise frequency spectrum may be stored in the noise storage section 162 in advance.

<Regarding Overlap of Frames in FIG. 2>

In addition, in the above description with reference to FIG. 2, there is no overlap between the respective frames. However, the present invention is not limited thereto, and there may be overlap between the respective frames. For example, half periods of adjacent frames may overlap each other.

In addition, the signal-processing section 250 may convert the audio signal of each of the frames into the frequency spectrum after multiplying the audio signal of each of the frames by a window function such as Hamming window.

In addition, in the above description with reference to FIG. 2, the audio signal is divided into the frames irrespective of the signal (a) which is input from the timing detection section 191 and indicates the timing, that is, the signal which indicates the timing when the operation section operates (refer to (c) of FIG. 2).

However, the present invention is not limited thereto. The signal-processing section 250 may control the position such that the audio signal is divided into the frames according to the signal (a) which is input from the timing detection section 191 and indicates the timing, that is, the signal which indicates the timing when the operation section operates. For example, the signal-processing section 250 may generate the frames with respect to the audio signal such that the frame boundaries of the audio signal matches the position (refer to Symbol O of FIG. 2) where the signal (a) which is input from the timing detection section 191 and indicates the timing, that is, the signal which indicates the timing when the operation section operates is changed from the low level to the high level.

The signal-processing section 250 may perform the above-described noise reduction processing on the basis of the period before the operation section operates and the period in which the operation section operates, according to the signal indicating the timing when the operation section operates.

In the above description, a case where the signal-processing section 250 performs the signal processing on the audio signal collected by the microphone 230 is described. However, the above-described processing of the signal-processing section 250 according to the present embodiment is not applied only to the audio signal collected in this way in real time.

For example, the signal-processing section 250 according to the present embodiment can also perform the above-described processing on an audio signal recorded in advance, that is, perform the above-described processing even in a case where a storage section such as the storage medium 200 stores the timing when the operation section of a device which records this audio signal operates, to be associated with the audio signal.

In the above description, the noise superimposed on the audio signal is mainly the sound generated by driving the optical system 400. However, the noise is not limited thereto. For example, the same shall be applied to a sound generated by pressing a button or the like of the manipulation section 180. In this case, a signal generated by pressing the button or the like of the manipulation section 180 is input to the timing detection section 191 of the CPU 190. Accordingly, similar to the case of driving the optical system 400, the timing detection section 191 can detect the timing when the manipulation section 180 or the like operates.

In addition, in the above description, the imaging apparatus 100 includes the signal-processing section 250. However, the signal-processing section 250 may be included in a sound recorder, a mobile phone, or a communication terminal.

The signal-processing section 250 in FIG. 1 or the respective components of the signal-processing section 250 may be realized by dedicated hardware or by a memory and a microprocessor.

Instead, the signal-processing section 250 or the respective components of the signal-processing section 250 may include a memory and a CPU (Central Processing Unit) and realize the functions thereof by loading a program for realizing the functions on the memory and executing the program.

In addition, the signal-processing section 250 in FIG. 1 or the respective components of the signal-processing section 250 may perform the process by the following method: the program for realizing the functions of the signal-processing section 250 or the respective components of the signal-processing section 250 may be stored in a computer-readable recording medium; and a computer system may read and execute the program stored in this recording medium. "The computer system" described herein includes an OS and hardware such as peripherals.

In addition, "the computer system" includes a homepage-providing environment (or a homepage display environment) when using the World Wide Web system.

In addition, "the computer-readable recording medium" refers to storage devices including flexible discs, magneto-optical discs, portable media such as ROM and CD-ROM, and hard discs built into the computer systems. Furthermore, "the computer-readable recording medium" includes: media dynamically holding the program in a short period of time, for example, a communication line of a case where the program is transmitted through a network such as the Internet or a communication line such as a telephone line; and media holding the program for a given time, for example, a volatile memory built into a computer system as a server or client in the above case where the program is transmitted through the communication line. In addition, the above-described program may partially realize the above-described functions. Furthermore, the above-described functions may be realized in combination with a program stored in advance in a computer system.

Hereinbefore, the embodiment of the present invention has been described with reference to the drawings. However, the specific configurations are not limited to the embodiment and include designs and the like within a range not departing from the scope of the present invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An audio data processing device that reduces an operation sound generated by an operation of an operation unit from first data including the operation sound and an audio data not including the operation sound, the audio data processing device comprising:

a processor that:

compares a first frequency spectrum at a predetermined frequency bin obtained by frequency-converting the first data obtained at one time including the operation sound and the audio data not including the operation sound to a second frequency spectrum at the predetermined frequency bin based on a spectrum obtained by frequency-converting second data obtained at a different time different than the one time including the audio data and not including the operation sound; and performs a subtraction of a value based on a frequency spectrum of the operation sound from a magnitude of the first frequency spectrum at the predetermined frequency bin when the first frequency spectrum at the predetermined frequency bin is determined to be larger than the second frequency spectrum at the predetermined frequency bin, and do not perform the subtraction of the value based on the frequency spectrum of the operation sound from the magnitude of the first frequency spectrum at the predetermined frequency bin when the first frequency spectrum at the predetermined frequency bin is determined to be not larger than the second frequency spectrum at the predetermined frequency bin, to produce audio data with the operation sound reduced, wherein the first data including the operation sound and the audio data not including the operation sound is data obtained at the one time when the operation unit is operated, and the second data including the audio data and not including the operation sound is data obtained at the different time when the operation unit is not operated.

2. The audio data processing device according to claim 1, the processor further:

changes the magnitude of the first frequency spectrum at the predetermined frequency bin subtracted based on the operation sound to a predetermined magnitude.

3. The audio data processing device according to claim 1, the processor further:

substitutes the first frequency spectrum at the predetermined frequency bin with the second frequency spectrum at the predetermined frequency bin.

4. The audio data processing device according to claim 1, the processor further:

compares the first frequency spectrum and the second frequency spectrum for each frequency bin.

5. The audio data processing device according to claim 1, the processor further:

causes a storage unit to store an audio data obtained at a time the operation unit is not operated.

6. The audio data processing device according to claim 1, further comprising:

a detection unit that detects that the operation unit is operated, wherein the processor further determines whether or not an audio data includes the operation sound based on a detection of the detection unit.

7. The audio data processing device according to claim 1, wherein the magnitude of the first frequency spectrum at the predetermined frequency bin that is applied with the subtraction based on the operation sound is changed based on a magnitude of a third frequency spectrum at the predetermined frequency bin obtained by frequency-converting the data not including the operation sound.

8. The audio data processing device according to claim 7, wherein the third frequency spectrum is the second frequency spectrum.

9. The audio data processing device according to claim 1, wherein the second frequency spectrum is a spectrum generated based on a plurality of data not including the operation sound in the audio data.

10. The audio data processing device according to claim 1, wherein the operation sound generated by the operation of the operation unit is non-speech operation sound.

11. An imaging apparatus comprising:

the audio data processing device according to claim 1; and an operation unit that generates an operation sound.

12. An audio data processing method that reduces an operation sound generated by an operation of an operation unit from first data including the operation sound and an audio data not including the operation sound, the audio data processing method comprising:

comparing, using a processor, a first frequency spectrum at a predetermined frequency bin obtained by frequency-converting the first data obtained at one time including the operation sound and the audio data not including the operation sound to a second frequency spectrum at the predetermined frequency bin based on a spectrum obtained by frequency-converting second data obtained at a different time different than the one time including the audio data and not including the operation sound; and performing, using the processor, a subtraction of a value based on a frequency spectrum of the operation sound from a magnitude of the first frequency spectrum at the predetermined frequency bin when the first frequency spectrum at the predetermined frequency bin is determined to be larger than the second frequency spectrum at the predetermined frequency bin, and not performing the subtraction of the value based on the frequency spectrum of the operation sound from the magnitude of the first frequency spectrum at the predetermined frequency bin when the first frequency spectrum at the predetermined frequency bin is determined to be not larger than the second frequency spectrum at the predetermined frequency bin, to produce audio data with the operation sound reduced, wherein the first data including the operation sound and the audio data not including the operation sound is data obtained at the one time when the operation unit is operated, and the second data including the audio data and not including the operation sound is data obtained at the different time when the operation unit is not operated.

13. The audio data processing method according to claim 12, further comprising:

changing, using the processor, the magnitude of the first frequency spectrum at the predetermined frequency bin subtracted based on the operation sound to a predetermined magnitude.

14. The audio data processing method according to claim 12, further comprising:

substituting, using the processor, the first frequency spectrum at the predetermined frequency bin subtracted with the second frequency spectrum at the predetermined frequency bin.

15. The audio data processing method according to claim 12, further comprising:

comparing, using the processor, the first frequency spectrum and the second frequency spectrum for each frequency bin.

16. The audio data processing method according to claim 12, further comprising:

causing, using the processor, a storage unit to store an audio data obtained at a time the operation unit is not operated.

17. The audio data processing method according to claim 12, further comprising:

changing, using the processor, the magnitude of the first frequency spectrum at the predetermined frequency bin that is applied with the subtraction based on the operation sound based on a magnitude of a third frequency spectrum at the predetermined frequency bin obtained by frequency-converting the data not including the operation sound.

18. The audio data processing method according to claim 17, wherein the third frequency spectrum is the second frequency spectrum.

19. The audio data processing method according to claim 12, wherein the second frequency spectrum is a spectrum generated based on a plurality of data not including the operation sound in the audio data.

20. The audio data processing method according to claim 12, wherein the operation sound generated by the operation of the operation unit is non-speech operation sound.

21. An audio data processing device that reduces an operation sound generated by an operation of an operation unit from first data including the operation sound and an audio data not including the operation sound, the audio data processing device comprising:

a processor that:

compares a first frequency spectrum at a predetermined frequency bin obtained by frequency-converting the first data obtained at one time including the operation sound and the audio data not including the operation sound to a second frequency spectrum at the predetermined frequency bin based on a spectrum obtained by frequency-converting second data obtained at a different time different than the one time including the audio data and not including the operation sound; and performs a subtraction of a value based on a frequency spectrum of the operation sound from a magnitude of the first frequency spectrum at the predetermined frequency bin when the first frequency spectrum at the predetermined frequency bin is determined to be larger than the second frequency spectrum at the predetermined frequency bin, to produce audio data with the operation sound reduced, wherein the first data including the operation sound and the audio data not including the operation sound is data obtained at the one time when the operation unit is operated, and the second data including the audio data and not including the operation sound is data obtained at the different time when the operation unit is not operated.

22. An audio data processing method that reduces an operation sound generated by an operation of an operation unit from first data including the operation sound and an audio data not including the operation sound, the audio data processing method comprising:

comparing, using a processor, a first frequency spectrum at a predetermined frequency bin obtained by frequency-converting the first data obtained at one time including the operation sound and the audio data not including the operation sound to a second frequency spectrum at the predetermined frequency bin based on a spectrum obtained by frequency-converting second data obtained at a different time different than the one time including the audio data and not including the operation sound; and performing, using a processor, a subtraction of a value based on a frequency spectrum of the operation sound from a magnitude of the first frequency spectrum at the predetermined frequency bin when the first frequency spectrum at the predetermined frequency bin is determined to be larger than the second frequency spectrum at the predetermined frequency bin, to produce audio data with the operation sound reduced, wherein the first data including the operation sound and the audio data not including the operation sound is data obtained at the one time when the operation unit is operated, and the second data including the audio data and not including the operation sound is data obtained at the different time when the operation unit is not operated.

* * * * *